United States Patent

Ekstrom

[15] 3,703,191
[45] Nov. 21, 1972

[54] VALVE DEVICE
[72] Inventor: Staffan Walter Ekstrom, Lidingo, Sweden
[73] Assignee: AGA Aktiebolag, Lidingo, Sweden
[22] Filed: Dec. 23, 1970
[21] Appl. No.: 100,960

[30] Foreign Application Priority Data
Dec. 23, 1969    Sweden ................... 17812/69

[52] U.S. Cl. ............................................... 137/494
[51] Int. Cl. ........................................... F16k 31/12
[58] Field of Search ................... 137/495, 494, 491

[56] References Cited

UNITED STATES PATENTS

| 934,083 | 9/1909 | Mills | 137/491 |
|---|---|---|---|
| 1,032,194 | 7/1912 | Evans et al. | 137/495 X |
| 2,366,596 | 1/1945 | Clifton | 137/491 |
| 3,493,008 | 2/1970 | Scaglione | 137/491 X |
| 1,894,955 | 1/1933 | Jones | 137/494 X |
| 1,994,179 | 3/1935 | Raymond | 137/494 |
| 2,542,259 | 2/1951 | O'Leary | 137/494 X |

FOREIGN PATENTS OR APPLICATIONS

| 27,160 | 2/1964 | Germany | 137/494 |
|---|---|---|---|

*Primary Examiner*—M. Cary Nelson
*Assistant Examiner*—Robert J. Miller
*Attorney*—Larson, Taylor & Hinds

[57] ABSTRACT

A valve device comprising a valve housing with a feeding channel, the inlet of which has a valve seat and a balanced valve member arranged to contact said valve seat. The valve is provided with an inner pressure sensitive chamber which is connected with the inlet via an opening in the chamber walls. The pressure sensitive chamber is arranged to operate the valve body in the opening direction and bring it out of balance at a predetermined pressure.

4 Claims, 1 Drawing Figure

PATENTED NOV 21 1972
3,703,191
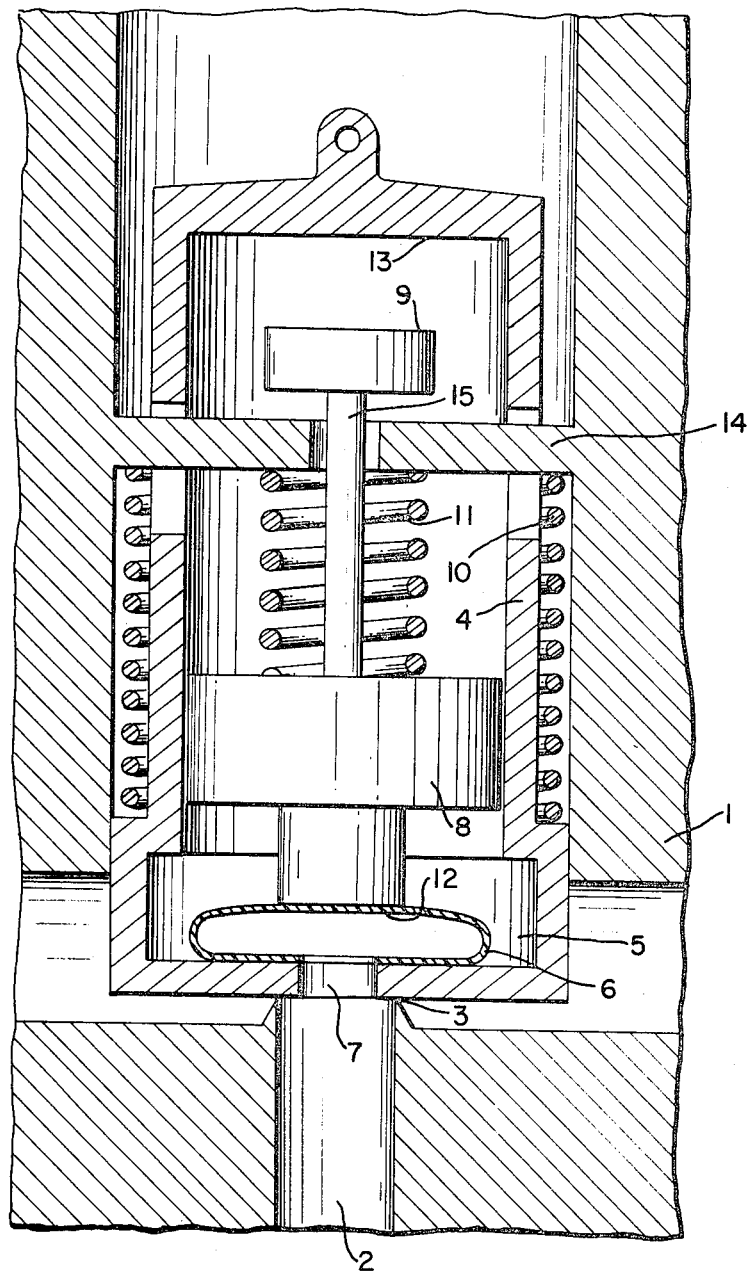
INVENTOR
STAFFAN W. EKSTRÖM
BY Larson, Taylor and Hinds
ATTORNEYS

VALVE DEVICE

The present invention relates to a valve device comprising a valve housing with a feeding channel, the inlet of which has a valve seat and a valve member arranged to contact said valve seat. The valve is provided with an inner pressure sensitive chamber which is connected with the inlet via an opening in the chamber walls.

There are two types of hitherto known valve devices, i.e. downstream and upstream valves. In a conventional downstream valve the valve body opens with the gas flow. Said valve body is mechanically operated so that the valve opens and a gas flow starts. The valve body is normally spring-loaded so that the valve remains closed up to a certain predetermined input pressure when the valve is not mechanically operated. If the input pressure exceeds the maximum value allowed the valve opens and functions as a safety valve.

In an upstream valve where the valve body opens against the gas flow a separate safety valve must be introduced if there is a risk that the incoming pressure will exceed the allowed value. By balancing the valve body in downstream as well as in upstream valves the force changes caused by variations in the incoming pressure may be avoided.

As mentioned above the upstream valve has a certain disadvantage in that a separate safety valve must be introduced. This also applies to downstream valves if the valve body is balanced. This disadvantage is eliminated in the valve device according to the invention, which is characterized in that the pressure sensitive chamber at a predetermined pressure is arranged to operate the valve body in the opening direction.

The valve according to the invention relates to the downstream type and has many ranges of application. For instance, it might advantageously be used as a breathing valve. The valve may be designated as a balanced downstream valve with safety function. Thus, the valve is balanced and is not influenced by any force in the opening direction caused by the incoming pressure as long as the incoming pressure is below a certain predetermined value. When the incoming pressure exceeds the predetermined maximum value the valve comes out of balance and opens.

A preferred embodiment of the valve according to the invention will be described below with reference to the accompanying drawing. The valve housing 1 has a feeding channel 2, a valve seat 3 being arranged around its inlet. In the inoperative position a valve body 4 is in contact with the valve seat 3. The valve body 4 has a chamber 5 in which an inner, pressure-sensitive and elastic chamber 6 is arranged. The lower wall of the inner chamber 6 is connected with the valve body 4. The space within the inner chamber 6 is opened into the feeding channel via an opening 7. Inner chamber 6 can be shaped as a bellow or a diaphragm. The inner chamber 6 abuts a movable part 8, loaded by a spring 11, cooperating with a support 14, which is fixed in the housing 1 and reaches into the valve body 4 through openings in the walls of valve body 4. The support 14 acts as a fixed point for the spring 11. Lower end surface 12 of the movable part 8 has the same area as the valve seat 3. Since the force, caused by the pressure on the supporting surface 12, is transferred by the prestressed movable part 8 the valve body 4 will be balanced. When the incoming pressure exceeds a certain predetermined value the force caused by the pressure on the movable part 8 will be higher than the counteracting spring load and the valve will come out of balance. The spring loaded movable part 8 then actuates the valve body 4 in the opening direction via surfaces 9 and 13. These surfaces may be arranged as projections on the walls of the valve body 4 and the movable part 8. It has, however, proved advantageous to provide the movable member 8 with an elongation 15 of piston shape, which passes the support 14 and is terminated with the surface 9.

In normal use when the incoming pressure is below the maximum value allowed, valve body 4 must be mechanically influenced by a force, greater than its counteracting spring force caused by a spring 10 so that the valve opens. The spring 10 is arranged in the valve housing 1 between one surface of the outer wall of the valve body 4 and the support 14.

The valve according to the invention may be modified within the scope of the invention and shall not be limited to the form of execution shown. Thus, both or one of the spring forces may be adjustable. The valve body may be mechanically influenced by different means. For instance, the valve body may be actuated by a diaphragm via a lever and may be used as an inlet valve in a breathing device.

I claim:

1. A valve device comprising: a valve housing having an inlet feed channel and an outlet feed channel, said inlet feed channel including a valve seat, a valve body movably mounted in said housing into and out of engagement with the valve seat to close and open communication between the inlet flow channel and the outlet flow channel, respectively, a spring means for urging the valve body into engagement with the valve seat, said valve body being hollow and including an opening facing and in fluid communication with the inlet flow channel, an inner expandable chamber mounted inside said hollow valve body and in fluid communication through said opening in the valve body with said inlet flow channel, a support member in said valve body, said support member including a supporting surface contacting the exterior of said expandable chamber, such that the support member is operable to disengage the valve body from the valve seat upon expansion of the expandable chamber, a spring means urging the supporting surface of the support member against the expandable chamber, and the area of the said support surface contacting the expandable chamber being equal to the area of the valve seat.

2. A valve device according to claim 1, said support member arranged to cooperate with the valve body to disengage the valve body from the valve seat at a predetermined pressure in the inlet feed channel.

3. A valve device according to claim 2, wherein the support member spring cooperates with a portion of the fixed valve housing through openings in the valve body, whereby the support member moves relative to the valve housing to act as a safety valve.

4. A valve device according to claim 3, wherein the load on at least one of said springs is adjustable.

* * * * *